United States Patent
Ebrahimpour et al.

(10) Patent No.: US 10,796,152 B2
(45) Date of Patent: Oct. 6, 2020

(54) VENTRAL-DORSAL NEURAL NETWORKS: OBJECT DETECTION VIA SELECTIVE ATTENTION

(71) Applicant: Ancestry.com Operations Inc., Lehi, UT (US)

(72) Inventors: Mohammad K. Ebrahimpour, Fremont, CA (US); Yen-Yun Yu, Murray, UT (US); Jiayun Li, Los Angeles, CA (US); Jack Reese, Lindon, UT (US); Azadeh Moghtaderi, San Francisco, CA (US)

(73) Assignee: ANCESTRY.COM OPERATIONS INC., Lehi, UT (US)

(*) Notice: Subject to any disclaimer, the term of this patent is extended or adjusted under 35 U.S.C. 154(b) by 0 days.

(21) Appl. No.: 16/573,180

(22) Filed: Sep. 17, 2019

(65) Prior Publication Data
US 2020/0097723 A1 Mar. 26, 2020

Related U.S. Application Data

(60) Provisional application No. 62/734,897, filed on Sep. 21, 2018.

(51) Int. Cl.
*G06K 9/00* (2006.01)
*G06F 17/15* (2006.01)
*G06N 3/08* (2006.01)
*G06N 3/04* (2006.01)

(52) U.S. Cl.
CPC ......... *G06K 9/00664* (2013.01); *G06F 17/15* (2013.01); *G06N 3/0454* (2013.01); *G06N 3/08* (2013.01)

(58) Field of Classification Search
CPC .. G06K 9/00664; G06F 17/15; G06N 3/0454; G06N 3/08
See application file for complete search history.

(56) References Cited

U.S. PATENT DOCUMENTS

| 10,354,122 B1* | 7/2019 | He .................. G06T 7/0012 |
| 2015/0379708 A1 | 12/2015 | Abramoff et al. |
| 2018/0025249 A1* | 1/2018 | Liu .................. G06T 7/11 382/158 |

(Continued)

FOREIGN PATENT DOCUMENTS

| EP | 3291172 A1 | 3/2018 |
| WO | 2018/222755 A1 | 12/2018 |

OTHER PUBLICATIONS

Maurizio Corbetta, "The Reorienting system of the Human brain: From environment to theory of mind", Neuron review (Year: 2008).*

(Continued)

*Primary Examiner* — Dhaval V Patel
(74) *Attorney, Agent, or Firm* — Kilpatrick Townsend & Stockton LLP

(57) ABSTRACT

Embodiments described herein relate generally to a methodology of efficient object classification within a visual medium. The methodology utilizes a first neural network to perform an attention based object localization within a visual medium to generate a visual mask. The visual mask is applied to the visual medium to generate a masked visual medium. The masked visual medium may be then fed into a second neural network to detect and classify objects within the visual medium.

20 Claims, 3 Drawing Sheets

(56) References Cited

U.S. PATENT DOCUMENTS

2018/0107928 A1    4/2018   Zhang et al.
2019/0130580 A1    5/2019   Chen et al.
2019/0147285 A1*   5/2019   Kobayashi ........... G06K 9/3241
                                                        382/103

OTHER PUBLICATIONS

Amanatiadis, et. al. "Understanding Deep Convolutional Networks through Gestalt Theory", Oct. 19, 2018 (Oct. 19, 2018), 7 pgs.
International Search Report and Written Opinion dated Nov. 19, 2019 in related foreign application No. PCT/US2019/051868, all pgs.

* cited by examiner

VENTRAL-DORSAL NEURAL NETWORKS: OBJECT DETECTION VIA SELECTIVE ATTENTION

RELATED APPLICATIONS

This application claims priority under 35 U.S.C. § 119(e) to U.S. provisional application 62/734,897 entitled "Ventral-Dorsal Neural Networks: Object Detection Via Selective Attention" filed on Sep. 21, 2018, the contents of which are incorporated by reference in its entirety for all purposes.

BACKGROUND

Object detection within computer vision is becoming an increasingly important aspect of data processing. Object detection may generally relate to an image processing methodology that detects and defines objects (e.g., buildings, particular people, etc.) within digital images and videos. Object detection has several uses such as, but not limited to, advanced driver assistance systems, video surveillance, image retrieval systems, visual search engines, and facial detection. However, in order for object detection to be useful it must have a certain level of accuracy. Furthermore, in order for object detection to be practical it must also have a certain level of efficiency. For example, if an object detection method is highly accurate but is slow and/or requires a vast amount of computer resources it may not be practical to implement. At the same time, if an object detection method is light (i.e. does not require a vast amount of computer resources) but highly inaccurate it may not be useful. Therefore, given the myriad of applications of object detection methods, there is a need for an object detection method and system that is highly accurate but also computationally efficient.

BRIEF SUMMARY

Embodiments described herein relate generally to a ventral-dorsal neural network for performing accurate and efficient object detection within visual mediums. The ventral-dorsal neural network may comprise a computing system, including one or more processors, a non-transitory storage medium, and a computer-implemented method comprising instructions for receiving a visual medium comprising a plurality of object. The instructions may further comprise identifying, via a first neural network, one or more relevant visual regions and one or more irrelevant visual regions within the visual medium. The instructions may further comprise generating, based at least on the one or more irrelevant visual regions, a visual mask comprising a pixel array. The instructions may further comprise applying the visual mask to modify pixel intensity values of the one or more irrelevant visual regions to generate a masked visual medium. The instructions may further comprise identifying, via a second neural network, one or more objects of interest within the masked visual medium. The instructions may further comprise outputting an identification of the one or more objects of interest.

In one embodiment, the pixel intensity values associated with the one or more relevant visual regions are non-zero. In one embodiment, the pixel intensity values associated with the one or more irrelevant visual regions are zero.

In one embodiment, the first neural network is a deep convolutional attention based object detection neural network. In one embodiment, the second neural network is a supervised object detection neural network. In one embodiment, the second neural network may only be utilized on the masked visual medium portion of the visual medium.

In one embodiment, the instructions may further comprise extracting convolutional features from the visual medium and aggregating the extracted convolutional features into a Gestalt Total output. The instructions may further comprise identifying, via a sensitivity analysis, pixels within the visual medium that are above a predetermined threshold, wherein the pixels above the predetermined threshold define the one or more relevant visual regions.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
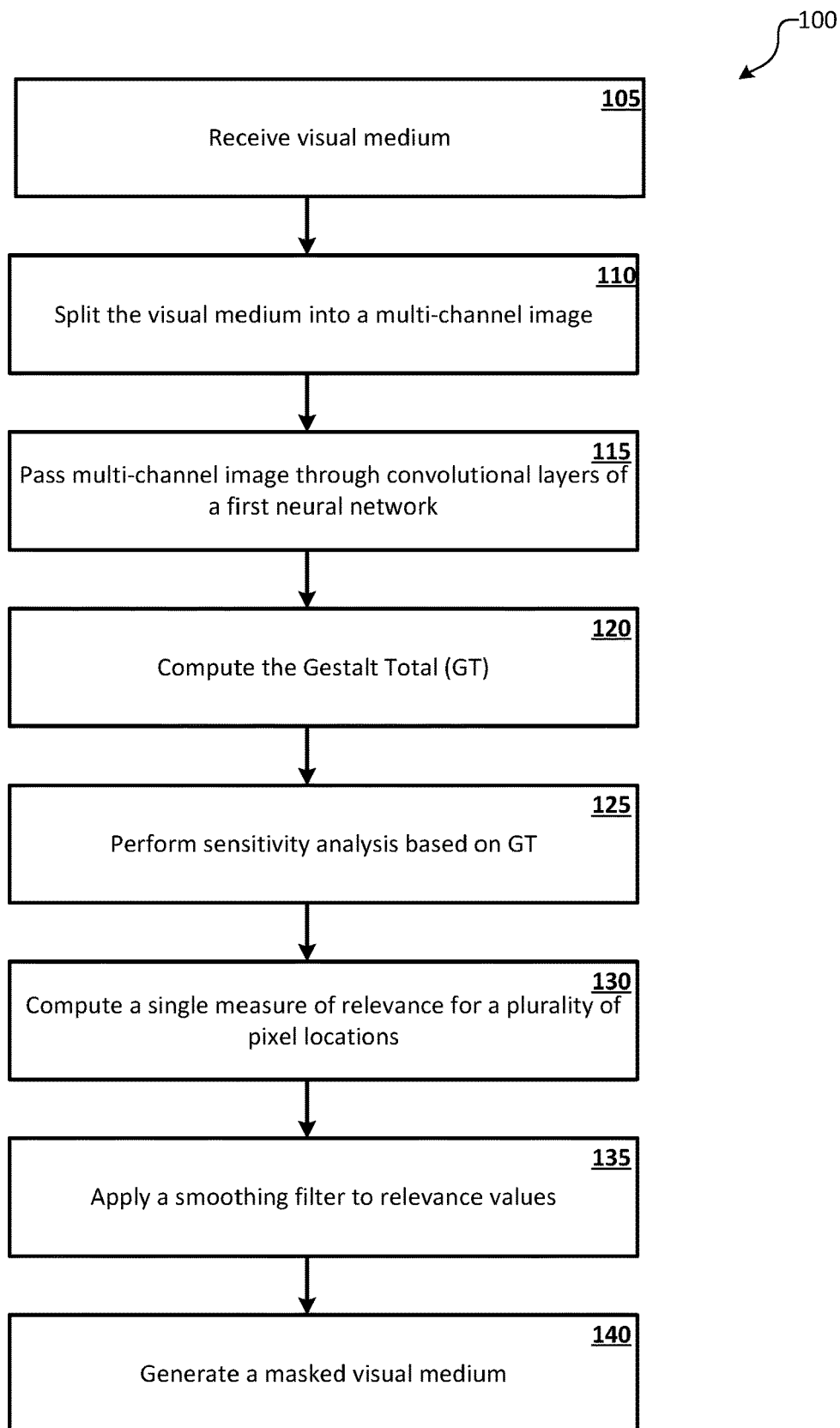
FIG. 1 illustrates a first process in accordance with one or more embodiments described herein.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments disclosed herein relate generally to a ventral-dorsal neural network for performing accurate and efficient object detection within visual mediums (e.g., digital images, digital videos, etc.). The ventral-dorsal neural network is based on the way that the human brain often processes images. In the human brain, images are processed along two separate neural streams, one in the temporal lobe and the other in the parietal lobe. The coarse functional distinction between these streams is between object recognition—the "what"—as in what objects are present in the image—and the "where"—as in where are the objects within the image. The ventral pathway from primary visual cortex, entering the temporal lobe, is dominated by "what" information, while the dorsal pathway, into the parietal lobe, is dominated by "where" information. Based on the ventral pathway and the dorsal pathway, embodiments disclosed herein propose the integration of a ventral network and a dorsal network to perform object detection within a visual medium.

The ventral network of the ventral-dorsal neural network uses attention based object detection in order to identify relevant portions of a visual medium. Within the construct of the ventral-dorsal neural network, the ventral network may utilize attention based object detection to quickly identify parts of a visual medium that are irrelevant with regards to objects of interest. Such a process may be referred to as a top-down salience analysis to identify irrelevant visual regions. Once the irrelevant visual regions are identified, a visual mask may be created for the visual medium that filters out irrelevant visual regions (e.g., noise and/or unimportant background information) from the visual medium. The result of applying the visual mask to the visual medium is a masked visual medium which contains only the relevant visual regions of the visual medium.

The dorsal network of the ventral-dorsal neural network uses supervised object detection to identify objects within the masked visual medium. Because the masked visual medium contains only relevant portions of a visual medium (e.g., irrelevant portions of the visual medium have a pixel value of zero while the relevant portions have a pixel value of non-zero), then the supervised object detection mechanism performed by the dorsal network may only be performed on a fraction of the visual medium. Focusing the supervised object detection on important visual regions allows for the efficient allocation of computation resources because computational resources may only be spent on a limited portion of the visual medium instead of the whole visual medium. Furthermore, by performing supervised object detection only on the masked visual medium, the accuracy of the supervised object detection may be improved because the scope of detection required by the supervised object detection is smaller than in instances where the whole visual medium is considered. The supervised object detection may be referred to as a bottom up saliency analysis. By combining the ventral network and the dorsal networks together, a more efficient and accurate object detection mechanism is achieved.

FIG. 1 illustrates an example process 100 according to one or more embodiments described herein. Process 100 may be a process performed using the ventral network to perform attention based object detection for object location within a visual medium. Process 100 may be executed by a processor that retrieves one or more operating instructions from a ventral network memory module. The order in which process steps are performed is not mandatory unless otherwise noted or logically required. Process 100 may be a process for object localization. Object localization may be defined as the process of identifying the position(s) of object(s) within a visual medium. Process 100 describes a new methodology for object localization using a deep convolutional neural network (CNN). Deep CNNs may include, but are not limited to, Vgg 16, AlexNet, ResNet (e.g., ResNet 18, ResNet 34, ResNet 50, ResNet 101, ResNet 152), DenseNet, and the like. Various parts of process 100 may utilize a previously trained image classification network (e.g., a previously trained CNN) in combination with a sensitivity analysis to identify important pixels within a visual medium. The sensitivity analysis may calculate the sensitivity of activation patterns at one or more network layers of a neural network for a specific input. The result of such a sensitivity analysis is a numeric value for each pixel in the input (e.g., input into one or more network layers of the neural network) that captures the degree to which small changes in that pixel give rise to large changes in the output category. These numeric values for each pixel may together form a sensitivity map of the visual medium that encodes image regions that are important for object classification. Once the important image regions are determined a mask (i.e. visual mask) may be applied to the visual medium to filter out all of the non-important image regions (i.e., irrelevant regions).

At 105, a processor receives a visual medium. The visual medium may be a dataset that contains visual information. For example, a visual medium may be a computer image, a photographic image, a video, a video stream, a still frame of a video, and the like. In one embodiment, the visual medium may also contain audio data. In such an embodiment, the visual medium may be a music video, a movie, and the like. The visual medium may be in compressed (lossless or lossy) format, such as, but not limited to, Joint Photographic Experts Group (JPEG), Tagged Image File Format (TIFF), Portable Network Graphics (PNG), Windows Media Video (WMV), Audio Video Interleave (AVI), and the like.

At 110, the processor splits the visual medium into a multi-channel (e.g., red-green-blue (RGB)) image. Color, grayscale, and black and white digital images are comprised of a plurality of pixels. Each of these pixels may be a combination of one or more base colors. Each base color may be a represented as a channel. In an RGB image there is a red channel that represents the visual medium according to the color red, a green channel that represents the visual medium according to the color green, and a blue channel that represents the visual medium according to the color blue. Thus, the visual medium is composed of three images, one image for each channel. Aside from an RGB channel, there may be other types of channels that are capable of being utilized to break down the visual medium. For example, YUV channels, cyan-magenta-yellow-black (CMYK) channels, Hue Saturation Value (HSV) channels, and the like. Regardless of the channels used, the processor splits the visual medium into the channels that comprise the visual medium.

At 115, the processor passes the multi-channel image through convolutional layers of a first neural network. As previously indicated, process 100 may utilize a deep CNN. Such deep CNNs may include, but are not limited to, LeNet, AlexNet, VGGNet 16, GoogleNet, ResNets, and the like. In general, deep CNNs comprise a plurality of convolution layers. The input into a convolution layer is output of a prior convolution layer and in the instance of the first convolution layer the input is an array of pixel values representing the visual medium. For example, a pixel array of 1920×1080×3 (i.e. Full High Definition (HD) RGB pixel array) may be received as an input into the first convolution layer. In each convolution layer, a kernel (also known as a filter or neuron) or multiple kernels may be convoluted across the input pixel array. The kernel is an array of values that indicate some type of feature. The kernel is applied to the input pixel array to determine one or more features by multiplying the values in the kernel to the pixels in the pixel array in a convoluted manner. The result of this multiplication process is an activation map (e.g., activation filter) that indicates areas within the input pixel array that likely contain the feature indicated by the kernel. The activation map is an array of pixel values. The activation map may be the input into a subsequent convolution layer. The feature that a subsequent kernel in the subsequent convolution layer indicates may become more detailed with each subsequent convolution layer. For example, in a first convolution layer a first kernel may indicate a curve and in the second convolution layer, a second kernel may indicate a curve with a line, and so forth until in the last convolution layer the last kernel may indicate a dog's paw. A kernel in each subsequent convolution layer may build on what was detected in the prior convolution layer. In addition, there may be multiple kernels within each convolution layer attempting to detect different objects in parallel. Thus, with each iteration of a convolution layer within a CNN, more and more details may be recognized within a visual medium. At the last convolution layer, one or more attention maps may be produced which are activation maps that may indicate high-level features (e.g., a bird's beak, a dog's paw, a tire, etc.) within the visual medium.

At 120, the processor computes the Gestalt Total (GT) for the one or more attention maps produced at 115. In one embodiment, the GT may be calculated by first calculating the Global Average Pooling (GAP) value for each attention map utilizing the following formula:

$$F^k = \sum_{x,y} f_k(x, y)$$

$F^k$ is the GAP for filter k, $f_k$ (x,y) is a pixel value of the attention map produced from filter k at spatial location (x,y). Each attention map may be the result of one or more filters that indicate a feature within the visual input. However, regardless of how many filters are used throughout the CNN, there may exist only one final filter per each attention map within the last convolution layer. For example, if there are 6 attention maps produced by the final convolution layer there may also be 6 final filters that were utilized to produce those 6 attention maps. After the GAP for each attention map has been determined, the GT may be calculated utilizing the following formula:

$$GT = \sum_k F^k$$

Thus, the GT may aggregate GAP value for each attention map. While the result of GT is a scalar value it carries valuable information by providing a way to identify pixels that have the greatest influence on the final convolution layer activity (e.g., attention map(s) produced by the final convolution layer). The pixels with the greatest influence may be identified by a sensitivity analysis.

At 125, the processor performs a sensitivity analysis based on the previously calculated GT. The sensitivity analysis determines the sensitivity or the change in value of GT when a pixel of the original visual medium is modified. The sensitivity analysis may be performed using the following formula:

$$S = \frac{\partial GT}{\partial X}, X = Ii$$

The formula is the derivate (or partial derivative) of GT at the point X=Ii. X is the visual medium or the visual medium split into a multi-channeled image (e.g., RGB image) and $Ii \in R^{x*y*z}$ is the $i^{th}$ visual medium into the CNN. $R^{x*y*z}$ is the domain, for which Ii is a member of, and x is the pixel width, y is pixel height, and z is the number of channels. For example, at 110, the visual medium may, when broken down into an RGB image, have the following values: x=1920, y=1080, and z=3, which indicates there are 3 channels of 1920*1080 inputs. S may be expressed as $S \in R^{x*y*z}$ (which may be referred to a sensitive map). Derivatives may be calculated for all of the inputs into the CNN, which may include three channels per pixel in the case of an RGB image. However, the purpose of the ventral network is to guide spatial attention. Thus, a single measure of relevance of each pixel location may be determined as opposed to determining a measure of relevance for each pixel location within each channel.

At 130, the processor determines a single measure of relevance for a plurality of pixel locations. There may be different ways to determine a single measure of relevance of each pixel location. One embodiment may involve averaging derivative values across channels using the following formula:

$$\hat{S}_{x,y} = \frac{1}{k} \sum_k Sx, y, k$$

k is the number of channels of the input into the CNN (e.g., 3 in the case of an RGB image), $\hat{S}$ is the $R^{x*y}$ result of aggregating derivatives. Thus, the sensitive analysis may be utilized to determine the importance of a pixel located at x, y. An alternative aggregation method may be to use the maximum derivative across channels by using the following formula:

$$\hat{S}_{x,y} = \max_k(Sx,y,k)$$

Regardless of the methodology used, the resulting $\hat{S}$ provides a measure of relevance at the indicated pixel level.

At 135, the processor applies a smoothing filter to $\hat{S}$. In order to translate the measure of relevance for each pixel location into larger regions of relevance, a smoothing filter (e.g., a Gaussian filter, Weiner filter, mean filter, minimum filter, maximum filter, median filter, and the like) may be convoluted with $\hat{S}$ to generate a smoothed attention map. To extract distinct regions from the resulting smoothed attention map, pixels can be classified as relevant or irrelevant. Such a categorization may be performed by setting to zero any pixel value in the smoothed attention map that is below a masking threshold. The pixel values in the smoothed attention map that are above a masking threshold may be set to one. In one embodiment, the masking threshold may be a mean pixel value of the smoothed attention map. The result is a visual mask containing an array of binary values (or any other appropriate data structure) that may be duplicated across the number of channels of the visual medium. At 140, the visual mask is applied to the visual medium, for example, through element-wise multiplication. This modified image (i.e., a masked visual medium) may then be provided to the dorsal network.

Process 100 describes a methodology for determining a numeric value for each pixel in the visual medium that captures the degree to which small changes in that pixel give rise to large changes in the GT value. These numeric values form a sensitivity map of the visual medium which indicates which sections of the visual medium are relevant (important for image classification). By measuring sensitivity using a partial derivate, the sensitivity may be quickly calculated. In addition, a partial derivate calculation is not a computationally expensive function. Using a partial derivate for sensitivity analysis may produce strong localization performance that may be performed quickly and without modification to an underlying CNN. Thus the sensitivity analysis may be used in conjunction with existing CNNs.

Process 100 describes a particular methodology for determining relevant portions of a visual medium based on attention based object detection. However, alternative embodiments may use any type of attention based object detection so long as relevant and irrelevant portions of a visual medium may be identified. Examples of such attention based objection detection CNN may be Class Activation Map, GradCAM, and the like. Once relevant portions of the visual medium are identified, a visual mask may be generated to remove the irrelevant portions of the visual medium.

Figure 2:
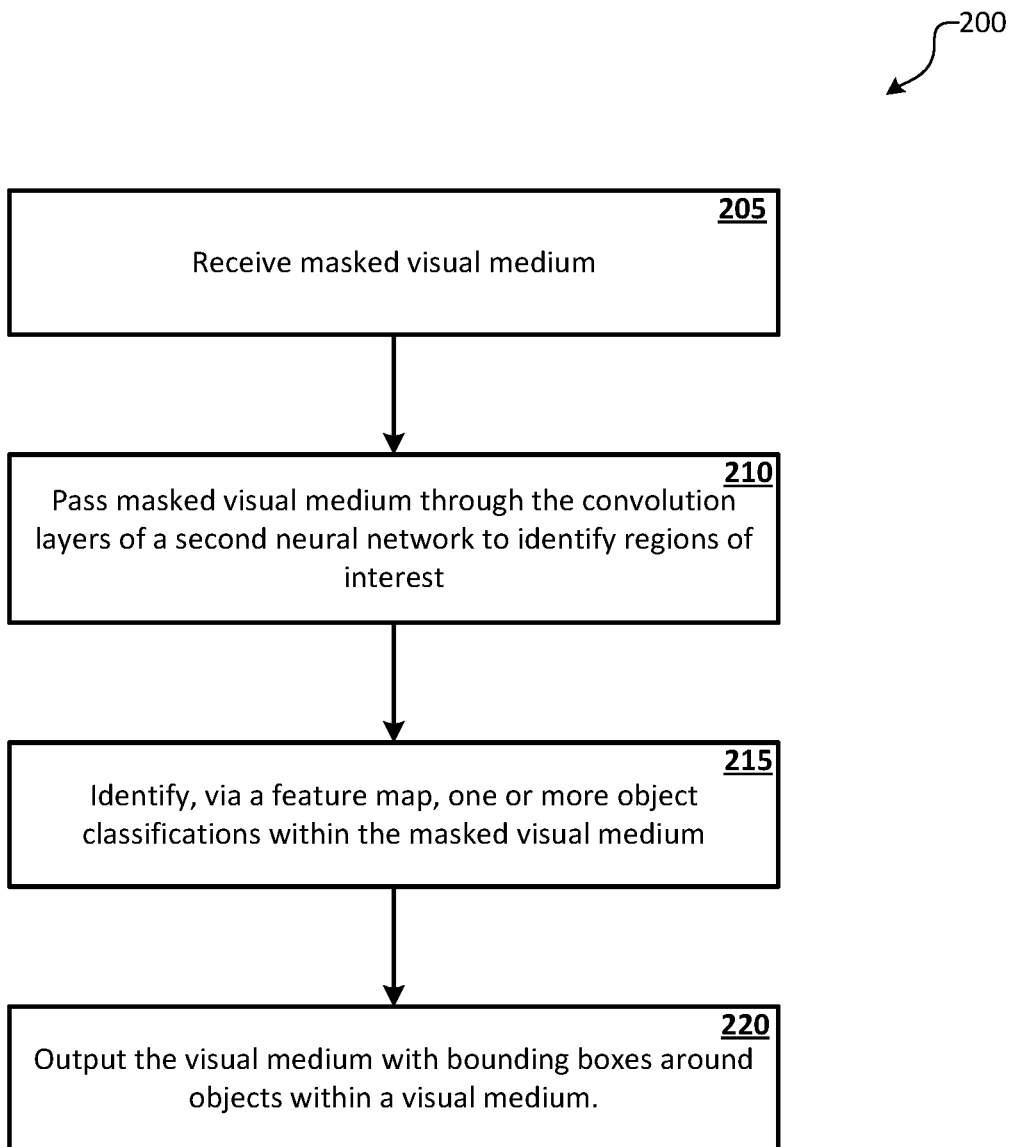
FIG. 2 illustrates a second process in accordance with one or more embodiments described herein.

FIG. 2 illustrates an example process 200 according to one or more embodiments described herein. Process 200 may be a process performed by the dorsal network to execute supervised object detection. Process 200 may be executed by a processor that retrieves one or more operating instructions from a dorsal network memory module. The order in which process steps are performed is not mandatory unless otherwise noted or logically required. Process 200 may be a process for object classification. Object classification may be defined as the process of identifying object(s) within a visual medium. Process 200 describes a new methodology for object classification using a deep CNN. Deep CNNs may include, but are not limited to, Faster-RCNN, Fast-RCNN, R-CNN, Mask-RCNN, You Only Look Once (YOLO), and the like. In one embodiment, the deep CNN utilized by process 200 for object classification is different than the deep CNN utilized by process 100 for object localization. Various parts of process 200 may utilize a previously trained image classification network (e.g., a previously trained CNN) to detect and identify one or more objects within a masked visual medium. The masked visual medium may include one or more portions of a visual medium. In one embodiment, the masked visual medium is a portion of the visual medium that contains relevant regions. By performing object classification on the masked visual medium, the space of candidate regions within the visual medium is reduced. Thus, the computation resources and the duration of time needed to perform object classification within a visual medium is greatly reduced.

At 205, a processor receives the masked visual medium. The masked visual medium may contain a portion of a visual medium. In one embodiment, the masked visual medium is determined by one or more parts of process 100. Process 200 is utilized to classify objects within the visual medium, by classifying objects with the masked visual medium. In one embodiment, the masked visual medium may be retrieved by the processor from one or more storage locations.

At 210, the processor passes the masked visual medium through convolution layers of the second neural network to identify regions of interest within the masked visual medium. As previously indicated, the second neural network may be a deep CNN such as Faster-RCNN. In conventional approaches, such a second neural network would be used on a full visual medium instead of a portion of the visual medium (i.e. masked visual medium). By using a smaller file, the amount of time it takes to pass the masked visual medium through the second neural network is greatly reduced as opposed to passing the whole visual medium through the same neural network. Furthermore, because the masked visual medium contains the relevant regions of the visual medium, the object classification achieved by the CNN may be more accurate than using the same CNN on the whole visual medium. The second neural network may be a deep CNN that is trained to propose regions of interest with anchor boxes, process the contents of those regions, and output both class labels and bounding box coordinates. The second neural network is trained using a dataset of images that are annotated with both ground truth class labels and ground truth bounding boxes. Second neural network parameters are selected to minimize a combination of the classification loss and the regression loss arising from the output of the bounding box coordinates. Once the second neural network identifies regions of interest (which includes objects of interest) within the masked visual medium, a feature map is generated.

At 215, the processor identifies, via the feature map, one or more object classifications within the masked visual medium. Once the feature map has been determined, the second neural network may be utilized to identify the region of proposals within the masked visual medium and wrap the regions of proposals into bounding boxes. Utilizing a region of interest (ROI) pooling layer of the second neural network, the bounding boxes may be reshaped into a fixed size so that the bounding boxes can be fed into a fully connected layer of the second neural network. From the ROI feature vector, a softmax layer of the neural network may be utilized to predict the class of the ROIs and also offset values for the bounding box(es) associated with the ROI(s).

At 220, the processor outputs the visual medium with bounding boxes around the objects of interest. The end result of process 200 is a visual medium that has bounding boxes around various objects in the visual medium. The various objects may be objects of interest that are located in the regions of interest within the masked visual medium. The bounding boxes may also indicate the classification of a corresponding object. For example, a classification may be human, bird, bike, etc. By presenting the visual medium with the bounding boxes and classifications, identified objects within a visual medium may be clearly recognized and identified by a human.

The combination of process 100 and process 200 may potentially speed up object detection processing by guiding a supervised object classification mechanism over partial image regions. These partial image regions may be determined by an attention based object localization mechanism (e.g., process 100). In addition to speeding up object classification, the removal of irrelevant material from the input into the object classification neural network (e.g., process 200) can improve object detection and classification accuracy. The approach of combining process 100 and process 200 is inspired by the visual system of the human brain.

Figure 3:
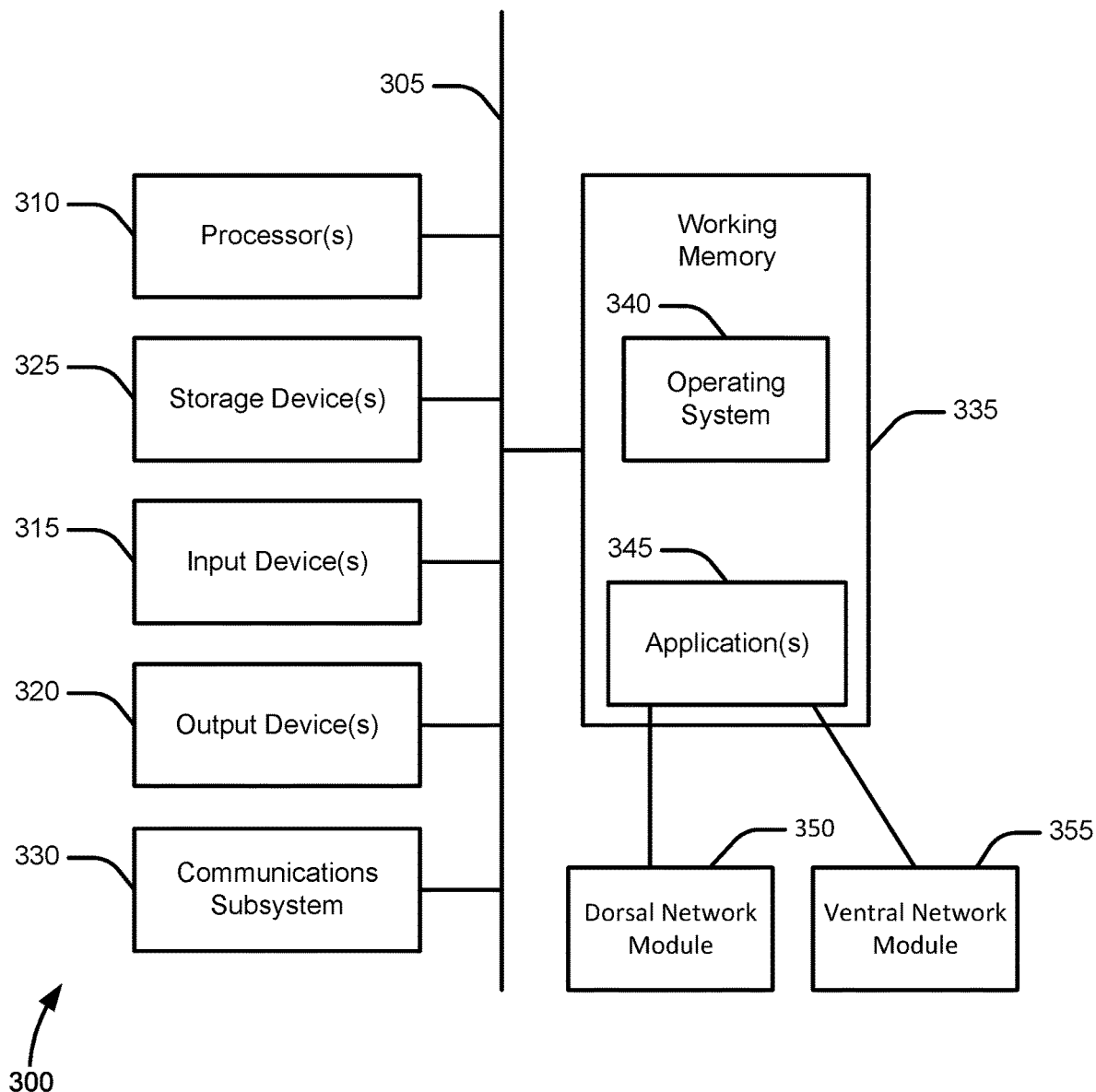
FIG. 3 illustrates a simplified computer system in accordance with one or more embodiments described herein.

FIG. 3 shows a simplified computer system 300, according to some embodiments of the present invention. FIG. 3 provides a schematic illustration of one embodiment of a computer system 300 that can perform some or all of the steps of the methods provided by various embodiments. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305, or may otherwise be in communication, as appropriate. The hardware elements may include one or more processors 310, including without limitation one or more special-purpose processors such as digital signal processing chips, graphics acceleration processors, and/or the like; one or more input devices 315, which can include without limitation a mouse, a keyboard, a camera, and/or the like; and one or more output devices 320, which can include without limitation a display device, a printer, and/or the like.

The computer system 300 may further include and/or be in communication with one or more non-transitory storage devices 325, which can comprise, without limitation, local and/or network accessible storage, and/or can include, without limitation, a disk drive, a drive array, an optical storage device, a solid-state storage device, and/or a read-only memory ("ROM"), which can be programmable, flash-updateable, and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 330 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 330. In other embodiments, a portable electronic device, e.g. the first electronic device, may be incorporated into the computer system 300, e.g., an electronic device as an input device 315. In some embodiments, the computer system 300 will further comprise a working memory 335, which can include a ROM device, as described above.

The computer system 300 also can include software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Application programs 345 may include dorsal network module 350 and ventral network module 355. Dorsal network module 350 may include instructions, that when executed by processor 310, cause processor 310 to pass an input visual medium through one or more convolution layers of a first neural network. Thus, dorsal network module 350 may store information to execute a first neural network. Ventral network module 355 may include instructions, that when executed by processor 310, cause processor 310 to pass an input masked visual medium through one or more convolution layers of a second neural network and output a visual medium with one or more objects identified. Thus, ventral network module 355 may store information to execute a second neural network and output a visual medium with bounding boxes that indicate one more objects within the visual medium.

A set of these instructions and/or code may be stored on a non-transitory computer-readable storage medium, such as the storage device(s) 325 described above. In some cases, the storage medium might be incorporated within a computer system, such as computer system 300. In other embodiments, the storage medium might be separate from a computer system e.g., a removable medium, such as a compact disc, and/or provided in an installation package, such that the storage medium can be used to program, configure, and/or adapt a computer with the instructions/code stored thereon. These instructions might take the form of executable code, which is executable by the computer system 300 and/or might take the form of source and/or installable code, which, upon compilation and/or installation on the computer system 300 e.g., using any of a variety of available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 300 to perform methods in accordance with various embodiments of the technology. According to a set of embodiments, some or all of the procedures of such methods are performed by the computer system 300 in response to processor 310 executing one or more sequences of one or more instructions, which might be incorporated into the operating system 340 and/or other code, such as an application program 345, contained in the working memory 335. Such instructions may be read into the working memory 335 from another computer-readable medium, such as one or more of the storage device(s) 325. Merely by way of example, execution of the sequences of instructions contained in the working memory 335 might cause the processor(s) 310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 300, various computer-readable media might be involved in providing instructions/code to processor(s) 310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300.

The communications subsystem 330 and/or components thereof generally will receive signals, and the bus 305 then might carry the signals and/or the data, instructions, etc. carried by the signals to the working memory 335, from which the processor(s) 310 retrieves and executes the instructions. The instructions received by the working memory 335 may optionally be stored on a non-transitory storage device 325 either before or after execution by the processor(s) 310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. For example, process 100 and/or process 200 contain one or more portions that may performed in a different order than as illustrated in FIGS. 1 and 2, respectively. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

The invention claimed is:

1. A computer-implemented method for object detection within a visual medium, comprising:
   receiving a visual medium comprising a plurality of objects;
   identifying, via a first neural network, one or more relevant visual regions and one or more irrelevant visual regions within the visual medium, comprising:
      identifying, via a sensitivity analysis, pixels within the visual medium that are above a predetermined threshold, wherein the pixels above the predetermined threshold define the one or more relevant visual regions;
   generating, based at least on the one or more irrelevant visual regions, a visual mask comprising a data structure containing pixel values;
   applying the visual mask to modify pixel intensity values of the one or more irrelevant visual regions to generate a masked visual medium;
   identifying, via a second neural network, one or more objects of interest within the masked visual medium; and
   outputting an identification of the one or more objects of interest.

2. The computer-implemented method of claim 1, wherein pixel intensity values associated with the one or more relevant visual regions are non-zero.

3. The computer-implemented method of claim 1, wherein pixel intensity values associated with the one or more irrelevant visual regions are zero.

4. The computer-implemented method of claim 1, wherein the first neural network is a deep convolutional attention based object detection neural network.

5. The computer-implemented method of claim 1, wherein the second neural network is a supervised object detection neural network.

6. The computer-implemented method of claim 1, wherein identifying, via the first neural network, one or more relevant visual regions and one or more irrelevant visual regions within the visual medium further comprises:
   extracting convolutional features from the visual medium and aggregating the extracted convolutional features into a Gestalt Total output.

7. The computer-implemented method of claim 1, wherein the second neural network is utilized on the masked visual medium portion of the visual medium.

8. A non-transitory computer-readable storage medium having stored thereon instructions for causing at least one computer system to detect objects within a visual medium, the instructions comprising:
   receiving a visual medium comprising a plurality of objects;
   identifying, via a first neural network, one or more relevant visual regions and one or more irrelevant visual regions within the visual medium, comprising:
      identifying, via a sensitivity analysis, pixels within the visual medium that are above a predetermined threshold, wherein the pixels above the predetermined threshold define the one or more relevant visual regions;
   generating, based at least on the one or more irrelevant visual regions, a visual mask comprising a data structure containing pixel values;

applying the visual mask to modify pixel intensity values of the one or more irrelevant visual regions to generate a masked visual medium;
identifying, via a second neural network, one or more objects of interest within the masked visual medium; and
outputting an identification of the one or more objects of interest.

9. The non-transitory computer-readable storage medium of claim 8, wherein pixel intensity values associated with the one or more relevant visual regions are non-zero.

10. The non-transitory computer-readable storage medium of claim 8, wherein pixel intensity values associated with the one or more irrelevant visual regions are zero.

11. The non-transitory computer-readable storage medium of claim 8, wherein the first neural network is a deep convolutional attention based object detection neural network.

12. The non-transitory computer-readable storage medium of claim 8, wherein the second neural network is a supervised object detection neural network.

13. The non-transitory computer-readable storage medium of claim 8, wherein identifying, via the first neural network, one or more relevant visual regions and one or more irrelevant visual regions within the visual medium further comprises:
extracting convolutional features from the visual medium and aggregating the extracted convolutional features into a Gestalt Total output.

14. The non-transitory computer-readable storage medium of claim 8, wherein the second neural network is only utilized on the masked visual medium portion of the visual medium.

15. A system for detecting objects within a visual medium, comprising:
one or more processors; and
a memory coupled with the one or more processors, the memory configured to store instructions that when executed by the one or more processors cause the one or more processors to:
receive a visual medium comprising a plurality of objects;
identify, via a first neural network, one or more relevant visual regions and one or more irrelevant visual regions within the visual medium, comprising:
identify, via a sensitivity analysis, pixels within the visual medium that are above a predetermined threshold, wherein the pixels above the predetermined threshold define the one or more relevant visual regions;
generate, based at least on the one or more irrelevant visual regions, a visual mask comprising a data structure containing pixel values;
apply the visual mask to modify pixel intensity values of the one or more irrelevant visual regions to generate a masked visual medium;
identify, via a second neural network, one or more objects of interest within the masked visual medium; and
output an identification of the one or more objects of interest.

16. The system of claim 15, wherein pixel intensity values associated with the one or more relevant visual regions are non-zero.

17. The system of claim 15, wherein pixel intensity values associated with the one or more irrelevant visual regions are zero.

18. The system of claim 15, wherein the first neural network is a deep convolutional attention based object detection neural network.

19. The system of claim 15, wherein the second neural network is a supervised object detection neural network.

20. The system of claim 15, wherein identify, via the first neural network, one or more relevant visual regions and one or more irrelevant visual regions within the visual medium further comprises:
extract convolutional features from the visual medium and aggregating the extracted convolutional features into a Gestalt Total output.

\* \* \* \* \*